United States Patent [19]

Lechner

[11] Patent Number: 4,686,398
[45] Date of Patent: Aug. 11, 1987

[54] ONE-PHASE STEPPING MOTOR

[75] Inventor: Hubert Lechner, Zug, Switzerland

[73] Assignee: LGZ Landis & Gyr Zug AG, Zug, Switzerland

[21] Appl. No.: 843,064

[22] Filed: Mar. 24, 1986

[30] Foreign Application Priority Data

Apr. 1, 1985 [CH] Switzerland .................. 01407/85

[51] Int. Cl.⁴ .................................... H02K 7/10
[52] U.S. Cl. ........................... 310/41; 310/165; 310/164
[58] Field of Search .................. 310/41, 162–165, 310/190, 257

[56] References Cited

U.S. PATENT DOCUMENTS

| 2,439,193 | 4/1948 | Weber | 310/164 X |
| 3,054,916 | 9/1962 | Cobb | 310/41 X |
| 3,857,053 | 12/1974 | Yatsushiro | 310/41 X |
| 4,021,689 | 5/1977 | Baltrush | 310/41 |
| 4,274,024 | 6/1981 | Gottschalk | 310/41 X |

Primary Examiner—Donovan F. Duggan
Attorney, Agent, or Firm—Marmorek, Guttman & Rubenstein

[57] ABSTRACT

The present invention is a one-phase stepping motor having a predetermined direction of rotation. The motor comprises a rotor having 2p permanently magnetized poles on its outer surface. The rotor is surrounded by a coil, which when energized forms the main stator poles. Auxiliary pole arms extend into the space between the coil and the rotor.

The rotor and coil are stored in a two-part housing which magnetically isolates the motor. The auxiliary pole arms extend inward from the top and bottom surfaces of the housing and are formed integrally therewith.

The arrangement of the auxiliary pole arms serves to determine the direction of rotation of the rotor. Illustratively, the auxiliary pole arms are divided into groups. Within each group, the auxiliary pole arms are at a distance from the rotor that decreases gradually or in stages in the direction of rotation of the rotor.

This one-phase stepping motor is especially suitable for driving counting mechanisms in electricity meters.

7 Claims, 5 Drawing Figures

ONE-PHASE STEPPING MOTOR

FIELD OF THE INVENTION

The present invention relates to a one-phase stepping motor with a predetermined direction of rotation.

BACKGROUND OF THE INVENTION

One-phase stepping motors convert electrical impulses of alternating polarity into step-by-step rotating movements. Such motors have a magnetic asymmetry for purposes of determination of the direction of rotation. In the one-phase stepping motor of Swiss Pat. No. 541,893, the magnetic asymmetry is achieved by providing a stator comprising main poles and auxiliary poles. Typically, the main poles are excited by a current resulting from the above-mentioned electrical pulses of alternating polarity. The auxiliary poles are permanently magnetized. The auxiliary poles are displaced vis-a-vis the main poles by an angle of 45° el and are arranged in such a way that no torque is produced by the auxiliary poles as a result of the current used to excite the main poles. The two types of poles are formed inside a two-part housing. In particular, the auxiliary poles are formed integral with and extend inward from the top and bottom surfaces of the housing.

The object of the present invention is to provide a one-phase stepping motor that cannot be influenced by external magnetic fields and which produces a minimal amount of stray magnetic fields.

SUMMARY OF THE INVENTION

The present invention is a one-phase stepping motor having a predetermined direction of rotation. The motor comprises a rotor having 2p permanently magnetized poles on its outer surface. The rotor is surrounded by a coil, which when energized forms the main stator poles. Auxiliary pole arms extend into the space between the coil and the rotor.

The rotor and coil and are stored in a two-part housing which magnetically isolates the motor. The auxiliary pole arms extend inward from the top and bottom surfaces of the housing and are formed integrally therewith.

The arrangement of the auxiliary pole arms serves to determine the direction of rotation of the rotor. Illustratively, the auxiliary pole arms are divided into groups. Illustratively, within each group, the auxiliary pole arms are at a distance from the rotor that decreases gradually or in stages in the direction of rotation of the rotor.

This one-phase stepping motor is especially suitable for driving counting mechanisms in electricity meters.

DETAILED DESCRIPTION OF THE INVENTION

Figure 1:
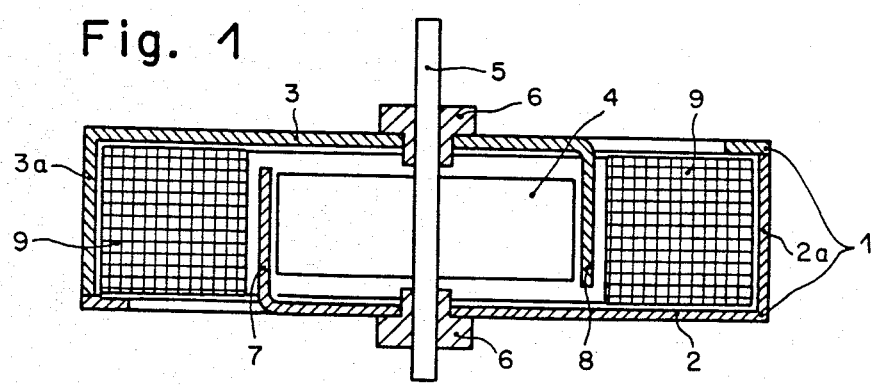
FIG. 1 shows a transverse section of a stepping motor, in accordance with an illustrative embodiment of the invention.

Turning to FIG. 1, a one-phase stepping motor having a predetermined rotation direction is illustrated. The motor comprises a housing 1 formed of two housing-halves 2 and 3. A rotor 4 has an axis 5 which rotates freely inside a bearing arranged in each of the housing-halves 2, 4. A coil 9 surrounds the rotor 4.

The two housing-halves 2 and 3 each comprise a soft magnetic sheet, each sheet being provided at its edges with a flap 2a or 3a, which is rectangularly folded in the shape of an L. Alternatively, housing-half 2a may be pan-shaped (i.e. housing-half 2a may comprise a flat bottom portion and side walls 2a, 3a) and housing-half 3 may comprise only a flat portion. In his case the housing-half 3 is formed by a deep-drawing or pan forming operation.

The two housing-halves 2 and 3 close tightly. The housing-halves 2 and 3 are provided with auxiliary stator poles which are formed by the pole arms 7 and 8. The pole arms 7 and 8 are cut out from the flat surfaces of housing-halves 2 and 3 and fold rectangularly inward into the space between the rotor 4 and the coil 9. To make the drawing clearer, only one pole arm 7,8 has been drawn for each housing-half 2, 3 in FIG. 1. The pole arms 7,8 lie in the sectional plane of FIG. 1. The poles arms 7 and 8 have a rectangular configuration, so that the openings in the flat surfaces of the housing-halves, resulting from the cutting out of the pole arms, form but a small area that opens to the outside.

Rotor 4 comprises a cylindrically shaped body having p permanently magnetized pole pairs on its outer surface. Since the rotor 4 is surrounded by the two housing-halves 2 and 3 and the pole arms 7 and 8 in the manner of a cage, it is generally not affected by external magnetic fields.

The pole arms 7, 8 are arranged in 2p groups, with n poles in each group. As stated above, p is the number of pole pairs on the rotor 4. Thus, there is a total of 2pn auxiliary poles.

Coil 9 is excited by D.C. voltage impulses of alternating polarity, it here being assumed that the positive and negative amplitudes are equally large. As this occurs, rotor 4 successively assumes positions displaced by 180°/p.

Figure 2:
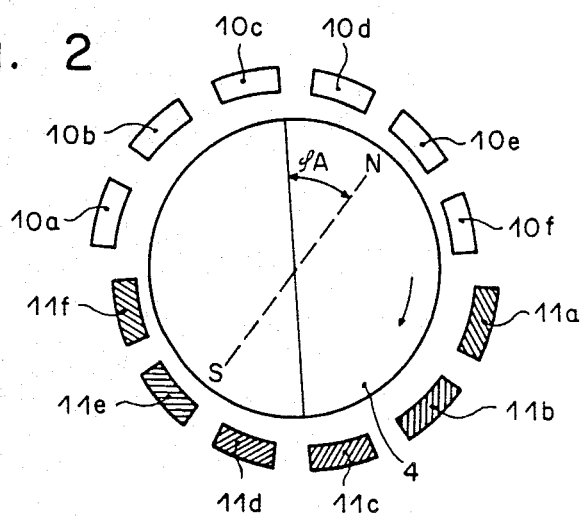
FIGS. 2, 4 and 5 show three possible arrangements of the auxiliary poles in the one-phase stepping motor of FIG. 1.

FIG. 2 shows a first arrangement of auxiliary poles for use in connection with a one-phase stepping motor having a two-pole rotor 4 (i.e. p=1). In FIG. 2 the auxiliary poles are divided into 2p=2 groups, each group having n=6 poles. Illustratively, the pole arms 10a to 10f are formed integrally with housing-half 3, while the pole arms 11a to 11f are formed integrally with housing-half 2. Illustratively, the two groups of poles 10a to 10f and 11a to 11f are of opposite polarity. The two groups of pole arms 10a to 10f and 11a to 11f, form a conical air gap, wherein within each group the distance between the pole arms and the rotor 4 decreases regularly in the direction of rotation. Because of the asymmetry of the magnetic circle resulting from such an arrangement, the rest position of rotor 4 is displaced from the intermediate position between the pole arms 10a to 10f and 11a to 11f. More particularly, the North-South axis of the rotor 4 (the dotted line in FIG. 2) is displaced by an angle $\phi_A$ from the intermediate position between the pole arms 10a to 10f and 11a to 11f (the solid line in FIG. 2).

Figure 3:
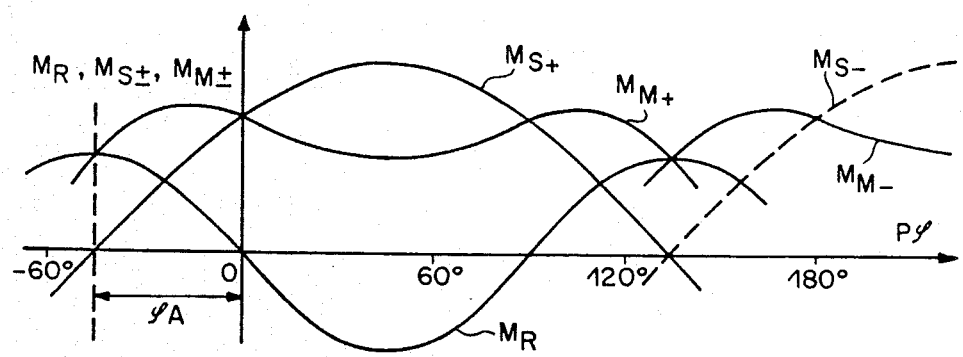
FIG. 3 plots the torques produced by the motor of FIG. 1.

In the diagram of FIG. 3, the motor moments or torques are represented as a function of the angle of rotation of the one-phase stepping motor of FIG. 1. In the state of the art, for instance in Swiss Pat. No. 541,893, the positive and negative motor moments show but a single pronounced maximum, while a second maximum of smaller amplitude is practically the same size as the minimum. Through the arrangement of the pole arms 10a to 10f and 11a to 11f in FIG. 2, the value of the second, previously wasted, maximum, and the value of the minimum, is strongly increased in the one-phase stepping motor of the present invention. There thus results the motor moments $M_{M+}$ and $M_{M-}$, each of which have two approximately equal maxima having relatively large amplitudes. The two maxima are separated from each other by a minimum which itself has a relatively large amplitude.

According to FIG. 3, the position of rotor 4 in the current-free state of coil 9 of FIG. 1 is determined by a rest moment $M_R$ which may, for example, follow a sine function and cross the zero axis at 0°, 90°, 180°, 270° and 360° el. On a positive excitation or voltage pulse there is produced a motor moment $M_{M+}$, which comprises the rest moment $M_R$ and a switching moment $M_{S+}$, produced by the excitation of the main stator poles (i.e. the coil 9). On a negative excitation or voltage pulse there is produced a motor moment $M_{M-}$, which comprises the rest moment $M_R$ and a switching moment $M_{S-}$ (dotted curve in FIG. 3) produced by the excitation of the main stator poles. The switching moment $M_{S-}$ has the same form as the switching moment $M_{S+}$, while lagging in phase by 180° el. The maximum of the characteristic curve of switching moment $M_{S+}$ and of switching moment $M_{S-}$, preferably, lies at an angle of rotation $\phi$ at which the rest moment $M_R$ has an approximate minimum. In each of these cases the following equations will apply:

$$M_{M+} = M_R + M_{S+} \text{ and}$$

$$M_{M-} = M_R + M_{S-}.$$

The magnitude of the excitation current is preferably selected in such a way that the maximal amplitudes of the switching moments $M_{S+}$ and $M_{S-}$ are twice as large as the maximal amplitude of the rest moment $M_R$. In this case:

$$M_{S+,max} = M_{S-,max} = 2 \cdot M_{R,max}.$$

Since rotor 4 is displaced by an angle $\phi_A$ as it starts its rotation(i.e. as it leaves its rest position), on application of a positive or negative voltage pulse to the coil 9 of FIG. 1, there will prevail a starting moment or torque such that the rotor 4 of FIG. 2 receives a defined starting direction of rotation in the clockwise direction. Rotor 4 has its stable or rest positions at 0° el $+\phi_A$ and 180° el $+\phi_A$. The motor moments $M_M$ (0°$+\phi_A$) and $M_M$ (180°$+\phi_A$) have positive values that trigger the desired starting moment.

Figure 4:
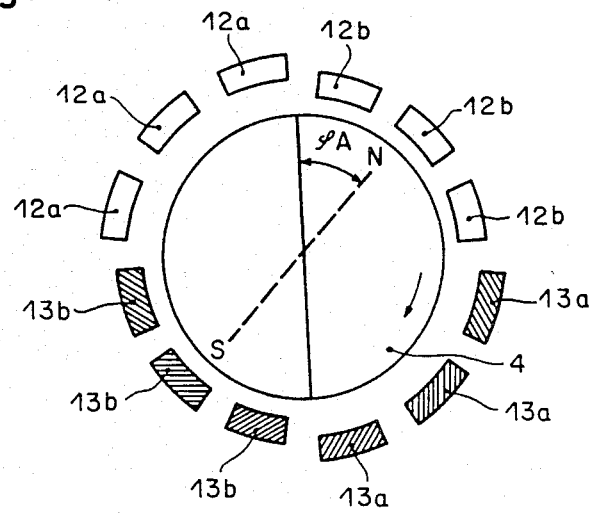

Like the pole arm sequence of FIG. 2., in the pole sequence of FIG. 4, the distance from the rotor 4 to the pole arms decreases within each group of poles arms, 12a to 12b and 13a to 13b, in the direction of rotation of the rotor 4. The decrease is achieved in a manner that differs from that of FIG. 2, yet the mode of operation is analogous. The three pole arms 13a of the housing-half 2 of FIG. 1 and the three pole arms 12a of the housing-half 3 of FIG. 1 are arranged at the same distance from the rotor 4. The pole arms 12a, 13a are equally spaced apart from each other, but are spaced a larger distance from rotor 4 than the three pole arms 13b of housing-half 2 of FIG. 1 and the three pole arms 12b of housing-half 3 of FIG. 1. The rest position of the North-South axis of rotor 4, (represented as a dotted line in FIG. 4) again finds itself displaced from the intermediate position between the pole arms 12, 13 by the angle $\phi_A$. The rest position corresponds to the position of minimum magnetic reluctance or resistance. In the pole arm arrangement of FIG. 4, there are 2p=2 groups of pole arms of opposite polarity, i.e. 12,13 with n=6 pole arms in each group.

Figure 5:
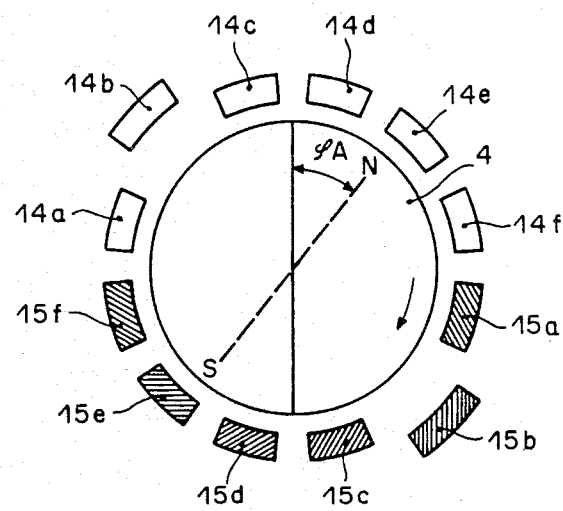

The pole sequence of FIG. 5 also causes an effect similar to that of the pole sequence of FIG. 2. In the arrangement of FIG. 5. there are two groups of pole arms of opposite polarity, 14a to 14f and 15a to 15f. The group 14 is formed integrally with housing-half 2 and the group 15 is formed integrally with housing-half 3. In each group there are n=6 pole arms. However this value for n is illustrative only. The embodiment of FIG. 5 typically may require that n be larger than 2. The pole arms 15c to 15f of the housing-half 2 of FIG. 1 and the pole arms 14c to 14f of housing-half 3 of FIG. 1 are arranged equally spaced apart from each other but at a relatively short distance from rotor 4. The pole arm 15b of housing-half 2 in FIG. 1, which is the second pole arm in the group 15 in the direction of rotation, and the pole arm 14b of housing-half 3 of FIG. 1, which is the second pole arm in the group 14 in the direction of rotation, are, at a much larger distance from rotor 4. The first pole arm in each group, 14a and 15a, in the direction of rotation of rotor 4, are arranged at the same distance from rotor 4 as the pole arms 14c to 14f and 15c to 15f. The rest position of the North-South axis of the rotor 4, as indicated by the dotted line in FIG. 5, is displaced by an angle $\phi_A$.

Housing 1 of the one-phase stepping motor can be manufactured in a simple manner by deep-drawing and/or a stamping operation employing uncomplicated forms. The pole arms 7, 8, 10a to 10f, 11a to 11f, 12a, 12b, 13a, 13b, 14a to 14f, 15a to 15f are formed by bending. The rotor 4 can be manufactured by the injection of mixtures of artificial material with ferrite agents. The small size of the openings in the housing-halves 2,3, resulting from the cutting out of the auxiliary pole arms, and the shielding of rotor 4 by pole arms 7, 8, 10a to 10f, 11a to 11f, 12a, 12b, 13a, 13b, 14a to 14f, and 15a to 15b against outside magnetic fields have been found to be of especial advantage for the driving of counting-mechanisms in electricity meters and counters.

The above described embodiments of the invention are intended to be illustrative only. Numerous alternative embodiments may be devised by those skilled in the art without departing from the spirit and scope of the following claims.

I claim:
1. A one-phase stepping motor comprising:
   a rotor having an outer periphery and having a plurality of permanently magnetized poles arranged on its outer periphery;
   a coil surrounding the rotor and defining a space between said rotor and said coil;
   a housing for said rotor and said coil comprising first and second housing-halves; and
   a plurality a pole arms extending from said housing-halves into the space between said coil and said rotor;
   said pole arm arrangement providing said rotor with a predetermined direction of rotation; said pole arms being divided into at least two groups each group comprising a plurality of pole arms; within each group, starting with at least the second pole arm in the direction of rotation of said rotor, the radial distance between said pole arms and said rotor decreasing along the direction of rotation;

said pole arms and said housing being arranged with respect to said rotor to protect said rotor from external magnet fields.

2. The stepping motor of claim 1 wherein said pole arms are rectangular in shape and are cut out of flat surfaces in said housing halves and folded into the space between said rotor and said coil.

3. The stepping motor of claim 1 wherein within said group of pole arms, the distance between said rotor and said pole arms decreases regularly in the direction of rotation of said rotor.

4. The stepping motor of claim 1 wherein within each group of pole arms, the distance between said rotor and said pole arms decreases in stages in the direction of rotation of said rotor.

5. The one-phase stepping motor of claim 1 wherein all of the pole arms in each group are equidistant from said rotor, except for one pole arm in each group which is located a larger distance from said rotor.

6. The one-phase stepping motor of claim 5 wherein within each group the second pole arm in the direction of rotation of said rotor is spaced a larger distance from said rotor.

7. A one-phase stepping motor comprising:
a rotor having an outer periphery and having a plurality of permanently magnetized poles arranged on its outer periphery;
a coil surrounding the rotor and defining a space between said rotor and said coil;
a housing for said rotor and said coil;
a plurality of pole arms extending from said housing into the space between said coil and said rotor;
said pole arm arrangement providing said rotor with a predetermined direction of rotation; said pole arms being divided into at least two groups each group comprising a plurality of pole arms; within each group starting with at least the second pole arm in the direction of rotation of said rotor, the radial distance between said pole arms and said rotor decreasing along the direction of rotation
said pole arms and said housing being arranged with respect to said rotor to protect said rotor from external magnetic fields.

* * * * *